(12) United States Patent  (10) Patent No.: US 8,756,131 B1
Pariante et al.  (45) Date of Patent: Jun. 17, 2014

(54) SYSTEM AND METHOD FOR INTEGRATED COMPUTERIZED BANKING

(75) Inventors: Grace Pariante, Palo Alto, CA (US); Aruna Harder, Sunnyvale, CA (US); Patricia Powell, Oakland, CA (US)

(73) Assignee: Intuit Inc., Mountain View, CA (US)

( * ) Notice: Subject to any disclaimer, the term of this patent is extended or adjusted under 35 U.S.C. 154(b) by 14 days.

(21) Appl. No.: 12/610,115

(22) Filed: Oct. 30, 2009

(51) Int. Cl.
*G06Q 40/00* (2012.01)

(52) U.S. Cl.
USPC .......................................................... 705/35

(58) Field of Classification Search
USPC .......................................................... 705/35
See application file for complete search history.

(56) References Cited

U.S. PATENT DOCUMENTS

| 2005/0240522 | A1 | 10/2005 | Kranzley et al. | |
| 2006/0085824 | A1* | 4/2006 | Bruck et al. | 725/86 |
| 2007/0192245 | A1* | 8/2007 | Fisher et al. | 705/39 |
| 2009/0119190 | A1* | 5/2009 | Realini | 705/30 |
| 2009/0319548 | A1* | 12/2009 | Brown et al. | 707/101 |
| 2011/0093386 | A1* | 4/2011 | Phillips et al. | 705/39 |

OTHER PUBLICATIONS

New Payment solutions from bottomline Anonymous. America's Community Banker 6.6 (Jun. 1997): 47.*
Java means Business Leger, Anne. Phillips Business Information's Internet Week 692 (Dec. 1, 1997): p. 65.*
US banker stakes a payments claim Talmor, Sharona. The Banker, suppl. e Banker (Apr. 1998): 36.*
Office Action dated Mar. 26, 2012, Interview Summary dated Jun. 25, 2012 and Amendment dated Jun. 26, 2012 in U.S. Appl. No. 12/610,135, filed Oct. 30, 2009, (22 pages).
Office Action dated Nov. 21, 2012 in U.S. Appl. No. 12/610,135, filed Oct. 30, 2009, (13 pages).
Amendment After Final dated Apr. 22, 2013 in U.S. Appl. No. 12/610,135, filed Oct. 30, 2009, (13 pages).
http://en.wikipedia.org/wiki/Open_Financial_Exchange.
Office Action dated Dec. 19, 2013 in U.S. Appl. No. 12/610,135, filed Oct. 30, 2009, (19 pages).

* cited by examiner

*Primary Examiner* — Hani M Kazimi
*Assistant Examiner* — Hatem M Ali
(74) *Attorney, Agent, or Firm* — Vista IP Law Group LLP

(57) ABSTRACT

Systems and methods for integrated computerized financial management are presented. Financial information from disparate systems is made available to an operator through a user interface that presents a unified view of financial information from such disparate systems and enables the operator to make and execute upon financial decisions. The operator utilizes an operator computing platform to access the financial information, and may be directly or indirectly connected with one or more databases containing financial information through various networking modalities configured to operate together in the unified presentation schema. Portable computing devices and reduced content variations of user interfaces may be utilized to enhance accessibility.

32 Claims, 17 Drawing Sheets

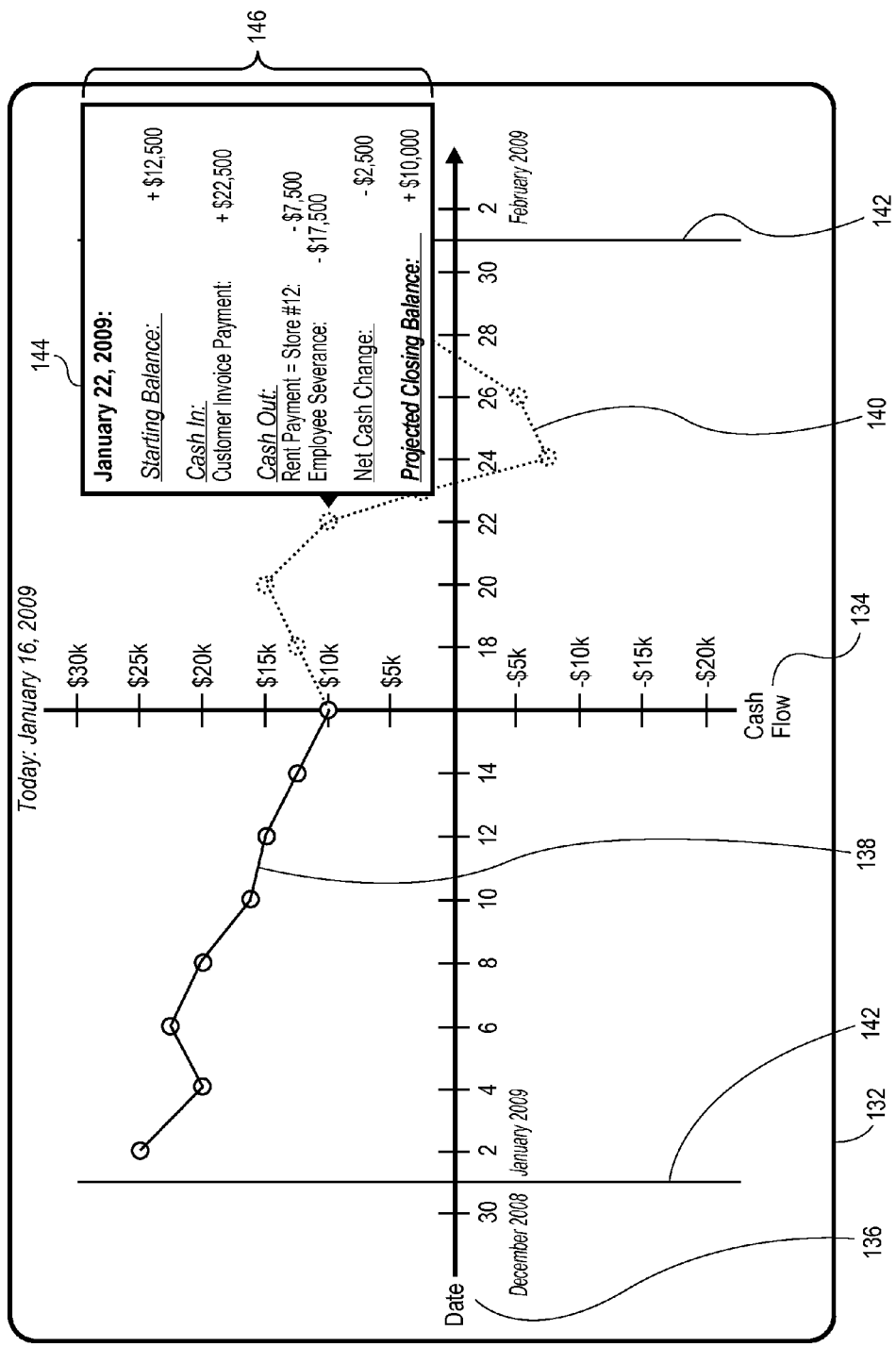

SYSTEM AND METHOD FOR INTEGRATED COMPUTERIZED BANKING

FIELD OF THE INVENTION

The invention relates generally to the interaction of human operators with financial information systems pertinent to personal and/or commercial banking, and specifically to the operation of software on computing systems configured to present an operator with an ability to see unified views of financial information from various disparate systems, and to use such information to execute upon financial decisions impacting the information on such disparate systems.

BACKGROUND

Millions of modern consumers engage in various types of computerized banking services. Indeed, the typical consumer is likely to utilize more than one computerized banking service, and one of the challenges in managing finances for a commercial enterprise, household, group, or individual is understanding all of the financial information having an impact on an overall financial scenario. For example, referring to FIG. 1, a conventional paradigm is illustrated. Using a small business enterprise for illustrative purposes, such enterprise typically will have at least one banking relationship (10) whereby funds may be stored in savings accounts, checking may be administered (12, 14), cash may be retrieved from brick and mortar locations at counters or ATM machines (16), and funds may be transferred. The bank typically will have an online service whereby the enterprise will be able to use a graphical user interface (2) to conduct various transactions, including bill pay (4), transfer of funds (6), report generation (8), previous record lookups, etc. The online banking interface (2) typically will be somewhat integrated (34) with the rest of the banking activity (10). For example, when a person from the business enterprise goes to an ATM machine and withdraws cash, this withdrawal will show up as an element in the reporting available through the bank's online interface for customers. The typical integration between the online (2) and other (10) banking systems is not perfect, and there are certain functionalities for which the customer will not have a choice of interfaces. For example, while some banks allow digital visibility into the process of administering checking (i.e., deposits, outgoing checks) from online banking interfaces, others do not, and such activity much be administered through more conventional channels. Referring again to FIG. 1, a typical enterprise will also have its own financial management program (18), which may be utilized to create income and expense statements (20), conduct cash flow analysis (22), conduct profit/loss analysis (24), prepare for tax documentation (26), process aspects of payroll (28), administer aspects of a checking operation (30), manage invoicing and accounts receivable (31), and operate to pay bills, transfer funds, and provide account summary reporting (32). Such financial management application (18) may reside on one or more computers local to the enterprise, or may be an online application residing on servers managed by other parties, such as a financial institution. For example, software applications available from producers such as various divisions of Intuit, Inc. under the tradenames Quicken®, Quickbooks®, and FinanceWorks® are utilized by millions of enterprises. Some enterprises will have various applications to handle various of the banking tasks for the enterprise. One of the challenges with the typical paradigm is that the conventional banking financial systems (2, 10) generally are not well integrated (36, 38) with the systems of the enterprise (18), and due to this lack of integration, it is difficult for operators and management within the typical enterprise to optimally manage their finances. In short, without manual updating of various systems that is often required, they lack a unified view to all of their financial information. Further, they lack an ability to make and execute financial decisions from a platform that will keep all systems up to date and in synchronization with each other.

SUMMARY

One embodiment of the invention is directed to a computerized financial management system, comprising a primary database comprising banking and transaction related information; an operator computing platform accessible by an operator and configured to display a user interface, the user interface configured to display information from the primary database and to process instructions regarding the processing of such information from the operator; wherein the primary database is automatically updated with additional banking and transaction related information acquired from one or more secondary databases; and wherein the operator computing platform is configured to present the operator with one or more unified views of banking and transaction related information aggregated from the primary and secondary databases, and allow the operator to execute financial decision instructions based upon the one or more unified views using the user interface. The primary database may be locally accessible to the operator computing platform, or may be remotely accessible to the operator computing platform. The primary database may be co-located with the operator computing platform. The system may further comprise a central computing platform operatively coupled to the primary database and operator computing platform, wherein the operator computing platform is locally available to the operator and the central computing platform is remotely available to the operator. The one or more secondary databases may reside remotely from the primary database and operator computing platform. The operator computing platform may be selected from the group consisting of a cellphone, a smartphone, a personal digital assistant, a netbook computer, a laptop computer, a desktop computer, and a computer terminal. The operator computing platform may be configured to display a reduced content user interface, the reduced content user interface configured to display information and to process instructions regarding the processing of such information from the operator with a relatively small amount of graphical content. The operator computing platform, the primary database, and the at least one secondary database may be operatively coupled utilizing a connection from the group consisting of a wired local connection, a wireless local connection, a wired remote connection, and a wireless remote connection. The additional banking and transaction related information may be acquired using an integration modality selected from the group consisting of screen scraping, one-way API integration, two-way API integration. The integration modality may comprise an API integration configured to dispatch XML packets.

Another embodiment is directed to a method for presenting and processing computerized financial information, comprising providing an operator with access to one or more unified views of banking and transaction related information aggregated from a primary database and at least one secondary database, wherein the primary database is configured to be operated by an operator computing platform, and wherein the secondary database is accessible to but not configured to be directly operated by the operator computing platform; and allowing the operator to execute financial decision instructions based upon the one or more unified views using the user interface. The method may further comprise automatically updating the primary database with additional banking and transaction related information from the one or more secondary databases. Automatically updating may comprise exchanging the additional banking and transaction related information between the primary database and at least one secondary database utilizing a connection selected from the group consisting of a wired local connection, a wireless local connection, a wired remote connection, and a wireless remote connection. Automatically updating may comprise exchanging the additional banking and transaction related information between the primary database and at least one secondary database utilizing an integration modality selected from the group consisting of screen scraping, one-way API integration, two-way API integration. Automatically updating may be conducted at a predetermined frequency, in real time, or in near-real-time. The method may further comprise updating at least one of the primary database or at least one secondary database based upon financial decision instructions executed by the operator. The method may further comprise presenting the operator with an updated unified view of the banking and transaction related information using the user interface subsequent to allowing the operator to execute financial decision instructions. Providing an operator with access to one or more unified views may comprise creating a reduced content view configured to be optimized for a reduced content display. The one or more unified views may be presented graphically in the user interface in an interactive manner such that the operator is able to graphically select certain aspects of the reports to have further underlying details presented.

BRIEF DESCRIPTION OF THE DRAWINGS

FIG. 6B illustrates one embodiment of a unified cash flow presentation interface wherein both retrospective and proform a data are depicted.

DETAILED DESCRIPTION

Figure 1:
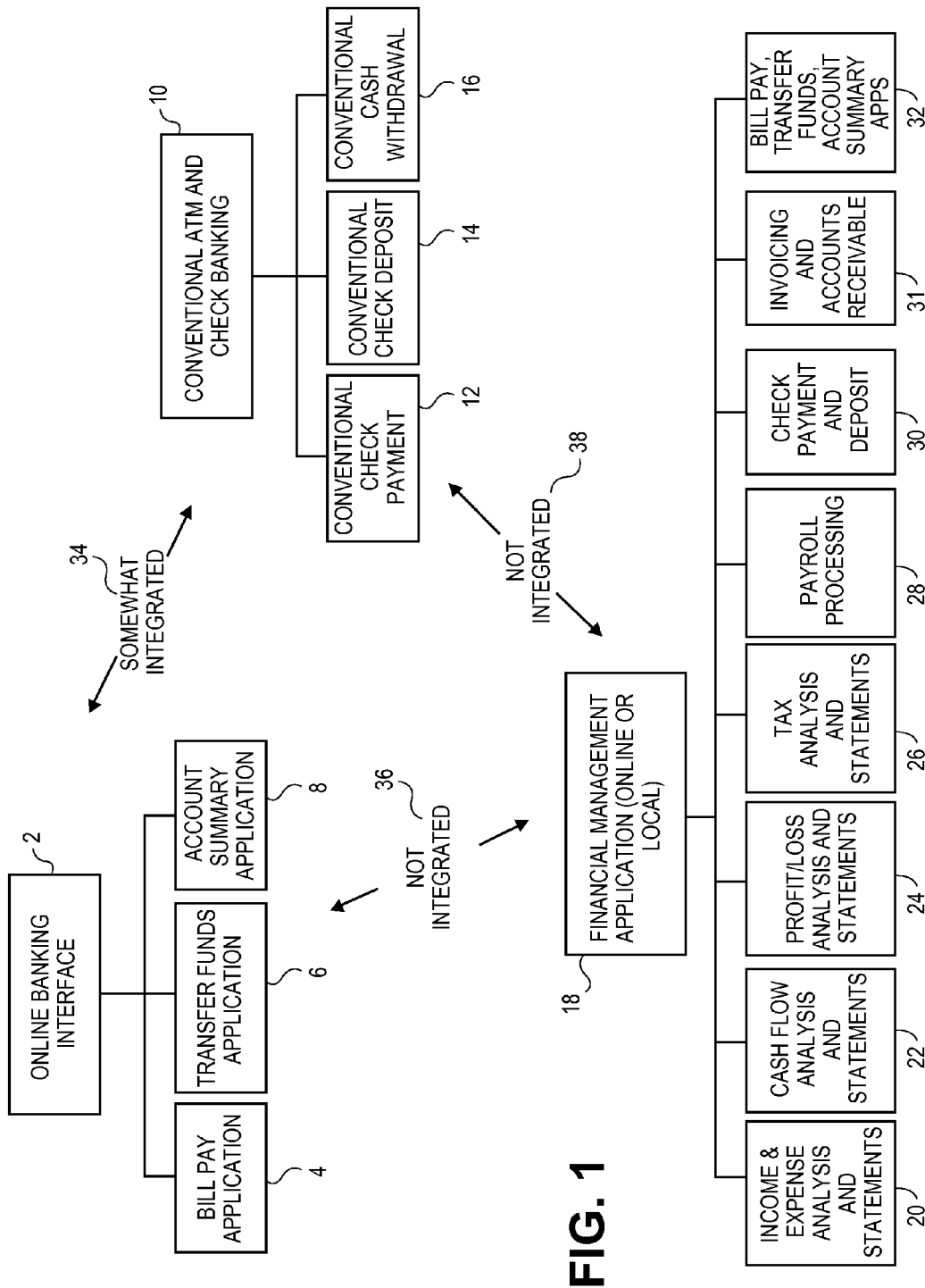
FIG. 1 illustrates a diagrammatic view of a conventional transaction processing relationship scenario.
Figure 2:
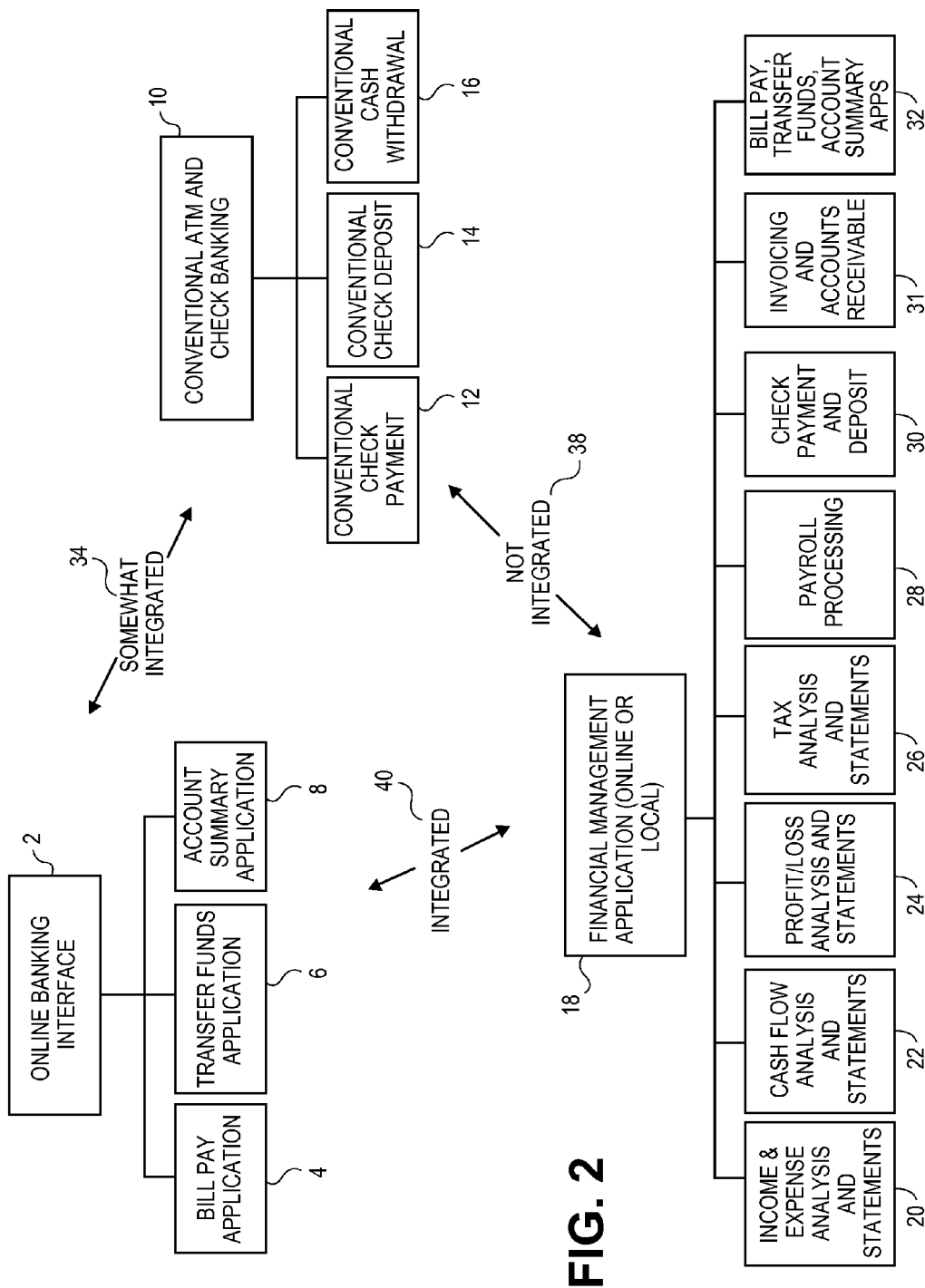
FIG. 2 illustrates a diagrammatic view of an integrated transaction processing relationship embodiment.
Figure 3:
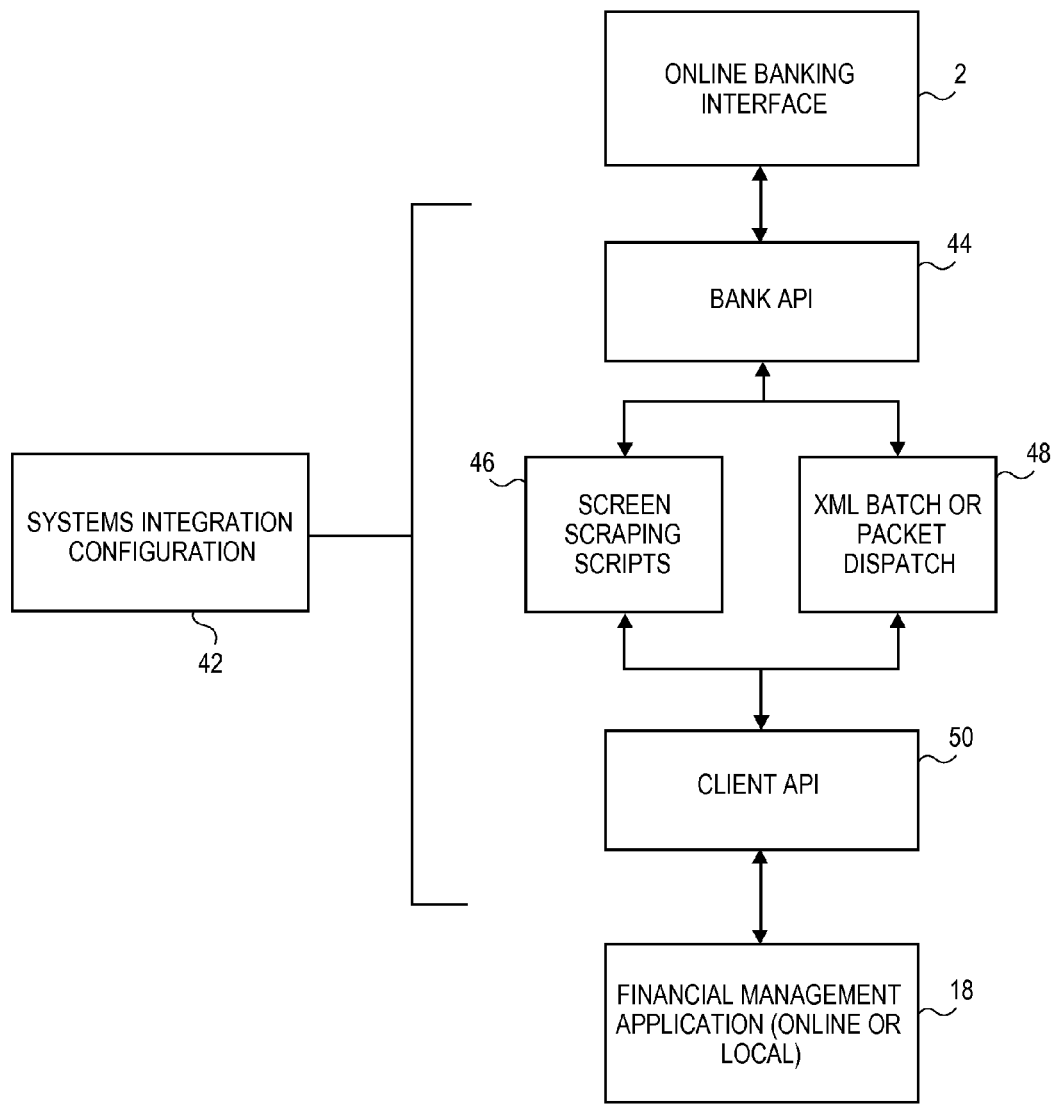
FIG. 3 illustrates aspects of a systems integration configuration for an online banking interface and a financial management application.

Referring to FIG. 2, a diagrammatic illustration of a paradigm similar to that depicted in FIG. 1 is depicted, with the exception that the financial management application (18) is integrated (40) with the online banking interface (2), which, as per the above description, is generally somewhat integrated (34) with other banking processes (10). In one embodiment, the integration (40) between systems requires realtime or near-real-time coordination of data using one or more application programming interfaces ("API") designed to move data between systems using, for example, extended markup language ("XML") packets and the like. In another embodiment more practical for most small enterprises, the integration (40) between systems requires coordination of data at a frequency prescribed or predetermined given the realities of data system connectivity and infrastructure, such as once per calendar day, once per business day, each time one or both of the systems has a new session initiated, every hour, etcetera. The integration may be a one-way integration, in which case one system, such as the enterprise's financial management application (18), receives and is populated with updated information from the banking systems (2, 10), but does not update or populate the banking systems (2, 10) in the reverse direction. Alternatively the integration may be a two way integration, whereby both systems (18, 2/10) are utilized to update each other. The selection of a one way integration may be related to banking rules or regulations, banking security issues, information technology infrastructure limitations, and the like. In one embodiment, either system (18, 2/10) may provide a well-documented API, in which case data may be moved in a predictable and organized fashion through such API using XML-based techniques such as the standard known as Open Financial Exchange ("OFX") or the proprietary QFX file format. In other embodiments, the function of an API may be substantially duplicated using scripts that are specifically designed to repeat commands that may be otherwise executed by a human operator. For example, in the event that a particular bank does not expose an API for systems integration with clients or customers, scripts may be utilized to position cursors, enter passwords, and acquire data using "screen scraping" capture techniques, such data being acquired for use with the particular enterprise's financial management system (18). Referring to FIG. 3, one variation of a systems integration configuration (42) is depicted, wherein an online banking interface (2) and a financial management application (18) are connected via APIs (44, 50) exposed for each system, so that data, such as XML-based batch or packet dispatch (48), may be utilized to move information both ways. In the case of screen scraping and scripts (46), the API on either end essentially comprises the user interface being accessed, which is configured for live human operator use, but may be utilized in an automated fashion by scripts designed to acquire data and move it.

Figure 4A:
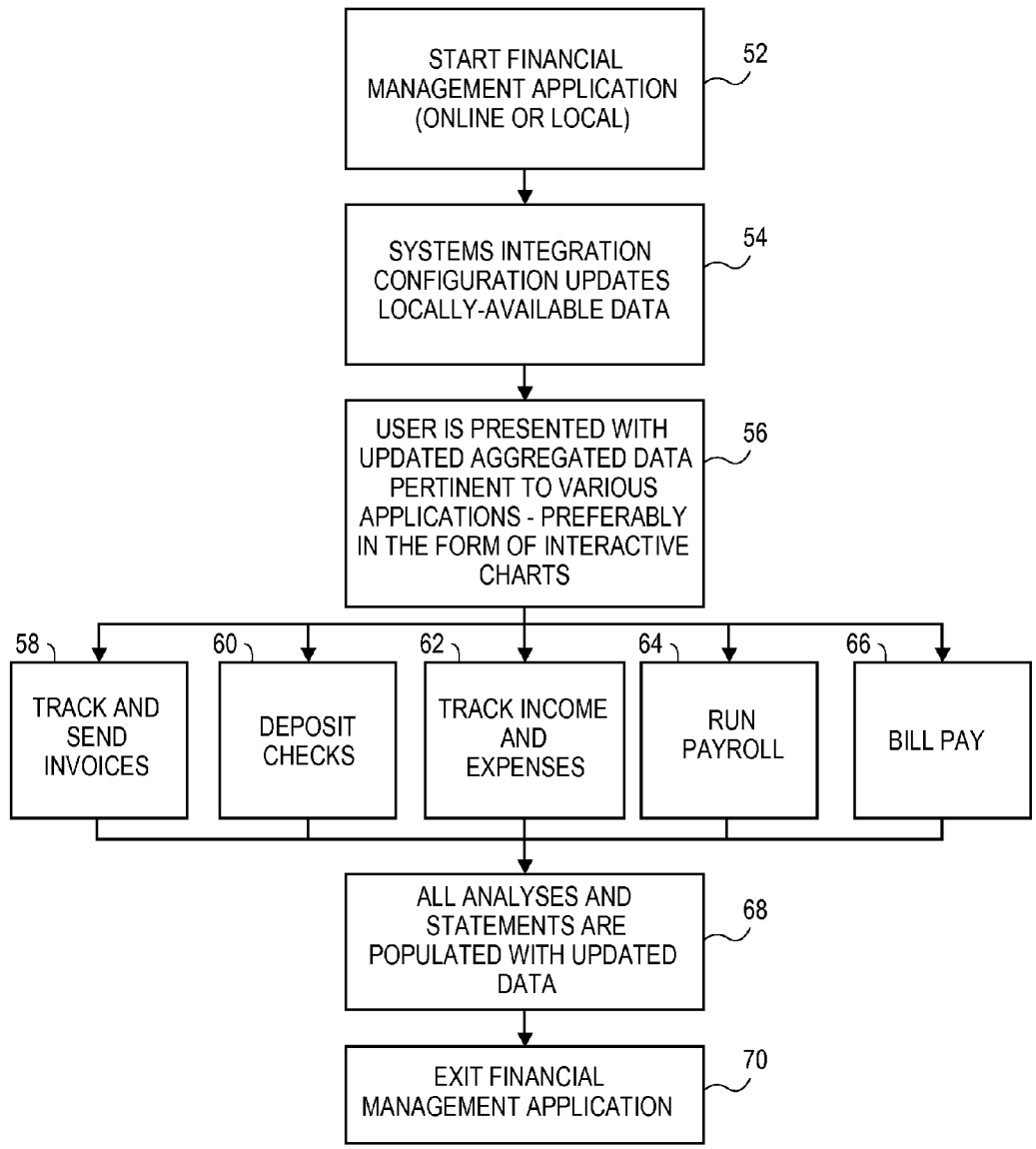
FIG. 4a illustrates a diagrammatic view of an integrated financial information processing embodiment wherein a user is presented with aggregated data pertinent to various disparate systems or databases.
Figure 4B:
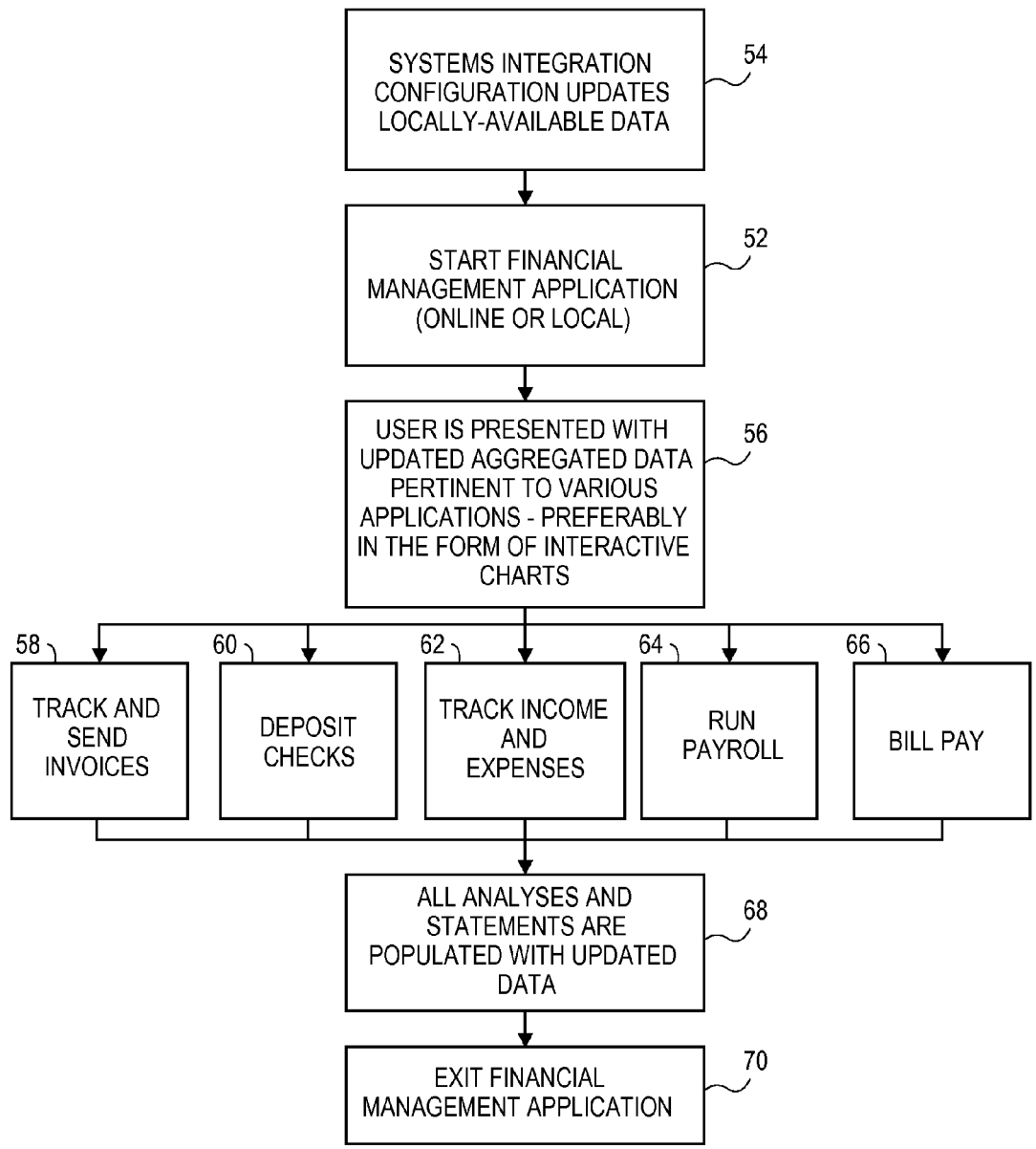
FIG. 4b illustrates a diagrammatic view of an integrated financial information processing embodiment wherein a user is presented with aggregated data pertinent to various disparate systems or databases.

Referring to FIG. 4A, a flowchart is depicted to illustrate one process embodiment wherein after a financial management application is started (52), for example by a small business enterprise starting up a local software application, logging in to an online application, or logging on to an online banking interface which is configured to be able to pass them to a financial management application, a systems integration configuration may be utilized to acquire updated information and populate local resources with such updates (54); in the case of an online financial management application, such "local" resources may reside remotely, but are available through the local interface and considered updated local resources. Given an updated and locally accessible database, the user may be presented with a unified view of the financial situation, containing data aggregated from one or more outside resources, such as information or data from a banking institution. In one embodiment, such aggregated or unified data is presented to the operator through a user interface in the form of interactive charts, tables, calendars, and the like, as described below in reference to FIGS. 5A-5C. Referring again to FIG. 4A, the updated aggregated information may be used by locally accessible and executable applications configured to track and send invoices (58), deposit checks (60), track income and expenses (62), administer payroll (64), and pay bills (66). As described above, any of such applications, as well as the financial management application (52) may reside on and/or be operated by local computing systems, or remote computing systems, such as on a remote server and operated locally through a web-based interface. Changes resulting from such operations may be incorporated into analyses, reports, statements and the like, and in the case of a two-way integration, also reported back to external systems such as banking systems (not shown—elements 2/10 in FIG. 2, for example) before or after the financial management application is exited (70) by the operator, in accordance with the particular data integration paradigm being used. Indeed, referring to FIG. 4B, a configuration similar to that depicted in FIG. 4A is shown, with the exception that the systems integration updating in the embodiment of FIG. 4B is conducted offline, before the operator starts a session of the financial management application (52). In one embodiment, it is preferable to conduct the systems integration updating in off-peak hours, such as at 2 am, to avoid peak demands on information technology infrastructures.

Figure 4C:
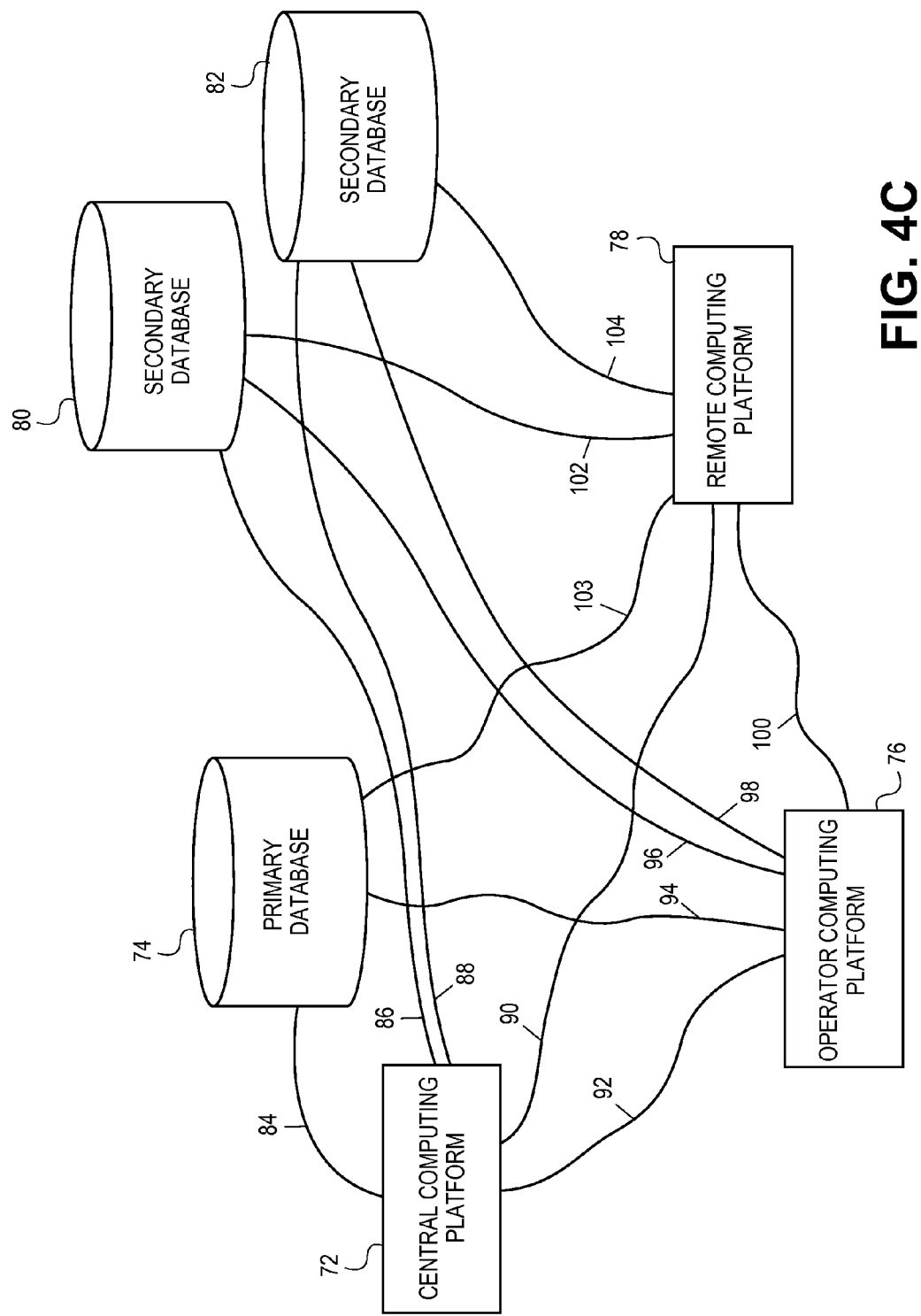
FIG. 4c illustrates a connectivity configuration whereby various disparate systems including an operator computing platform, primary database, and at least one secondary database may be operatively coupled.

Referring to FIG. 4C, a systems integration connectivity diagram is depicted. In a simplified embodiment, an operator computing platform (76) local to the operator and preferably having a graphical user interface and operating a software program such as a financial management application or portion ("front end") thereof is connected (94) to a primary database (74) that preferably is natively and directly integrated with the software application. In one embodiment, the operator computing platform (76) may be a laptop computer, the software may be a local application such as Quickbooks®, and the primary database (74) may be a relatively small database that resides on the hard drive of the laptop computer. In other embodiments, the operator computing platform may be a cellphone, a smartphone, a personal digital assistant, a netbook computer, a laptop computer, a desktop computer, or a computer terminal. In an embodiment wherein the operator wishes to engage the integrated systems utilizing a limited or small user interface, such as in the case of a cellphone user interface, a reduced content version of the user interface preferably is configured to allow such engagement with relatively efficient terms and graphics, such as those described below in reference to FIGS. 8A-8E. Referring again to FIG. 4C, the operator computing platform may be connected directly (96, 98) to external resources (80, 82), such as banking information, using the aforementioned integration paradigms, or may be integrated with another computing platform (72) configured to have connectivity to such secondary databases (80, 82) as well as connectivity (84) to the primary database (74), which may reside on a remote server in a scenario wherein the operator computing platform (76) is configured to operate an online or remote financial management software application which may, for example, be executed upon a central computing platform (72) and be configured to access the primary database (74) from the same or different location. In another embodiment, a remote computing platform, such as a cellphone, a smartphone, a personal digital assistant, a netbook computer, a laptop computer, a desktop computer, or a computer terminal, may be utilized to remotely operate the operator computing platform, which may be utilized to operate the financial management application as described above. Suitable remote access applications and/or services are available under the tradenames GoToMyPC®, PCNow®, PC Anywhere®, NetMeeting®, WebEx®, and the like. Each of the resources (72, 74, 76, 78, 80, 82) depicted in FIG. 4C may be housed (co-housed) within the same system, co-located within the same infrastructure location, or located at different remote locations. Each of the connections (84, 86, 88, 90, 92, 94, 96, 98, 100, 102, 103, 104) of the various embodiments illustrated by the superset of connections in FIG. 4C may be a wired local connection, a wireless local connection, a wired remote connection, and a wireless remote connection.

The terms "natively operatively coupled" and "non-natively operatively coupled" are used in reference to the levels and types of integration. For example, in the preferred embodiment, the primary database (74) is natively operatively coupled with either a central computing platform (72), such as a server executing a financial management application located remote from the operator, or an operator computing platform (76) located local to the operator, and such "native" operative coupling refers to a tight real or near-real time integration of such systems. In other words, in an embodiment wherein an application is executed on an operator's local laptop and the primary database also resides local on the operator's laptop, the integration between the application and the database will be very tight—and preferably prescribed, if not required, by the application. In other words, in one embodiment, the operator computing platform will not be able to successfully execute the software application without tight integration of the data on the primary database. Similarly, if an operator is operating the application online via a web browser or similar tool through an operator computing platform (76) or remote computing platform (78), and the application resides on a central computing platform (72) with the primary database (74) co-located, or remotely located, from such central computing platform (72), preferably the primary database (74) is natively operably coupled to enable the operator to successfully execute the application using the data from the primary database (74). The one or more secondary databases (80, 82), often residing on completely different, remote, or disparate infrastructure, may be non-natively operatively coupled with other systems, in which case the integration between the financial management software application and such resources is one of relatively loose connectivity, but not relatively tight "native" connectivity, wherein the disparate systems have been designed and implemented to work together. For example, an embodiment wherein a secondary database is connected to a computing platform with a one-way screen scraping/scripts based integration essentially designed to mimic manual human operation of software to acquire data from the secondary database comprises a non-native operative coupling. The systems are working together somewhat, but are not tightly integrated and were not specifically designed to work together. To the contrary, an embodiment wherein a secondary database is connected to a computing platform with a one or two-way real or near-real time integration through an API specifically designed to allow for such connectivity of these subsystems would be characterized as an implementation of a native operative coupling.

Figure 5A:
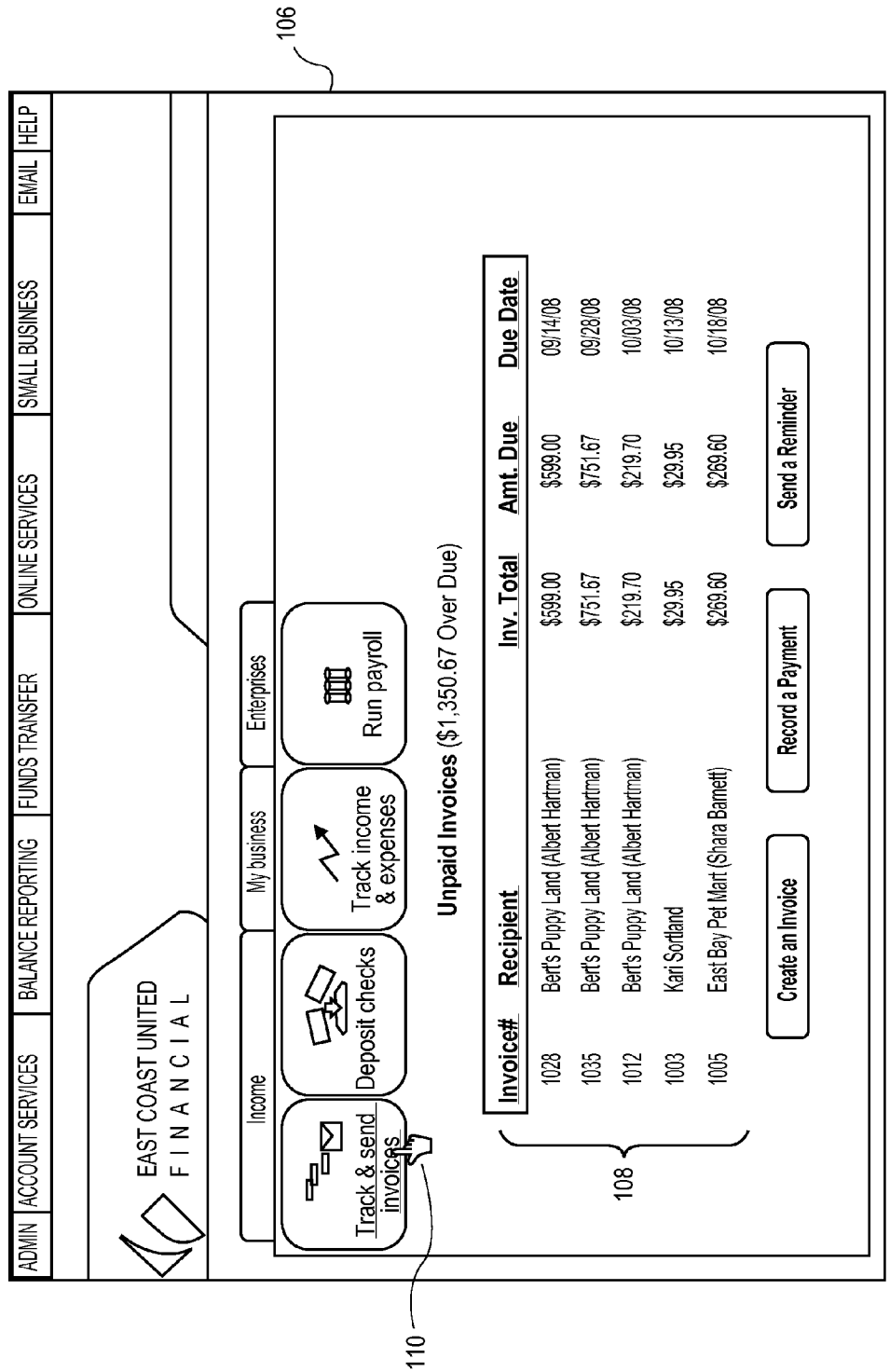
FIG. 5A illustrates one embodiment of a user interface embodiment wherein an operator is presented with a unified view of invoice-related information.
Figure 5B:
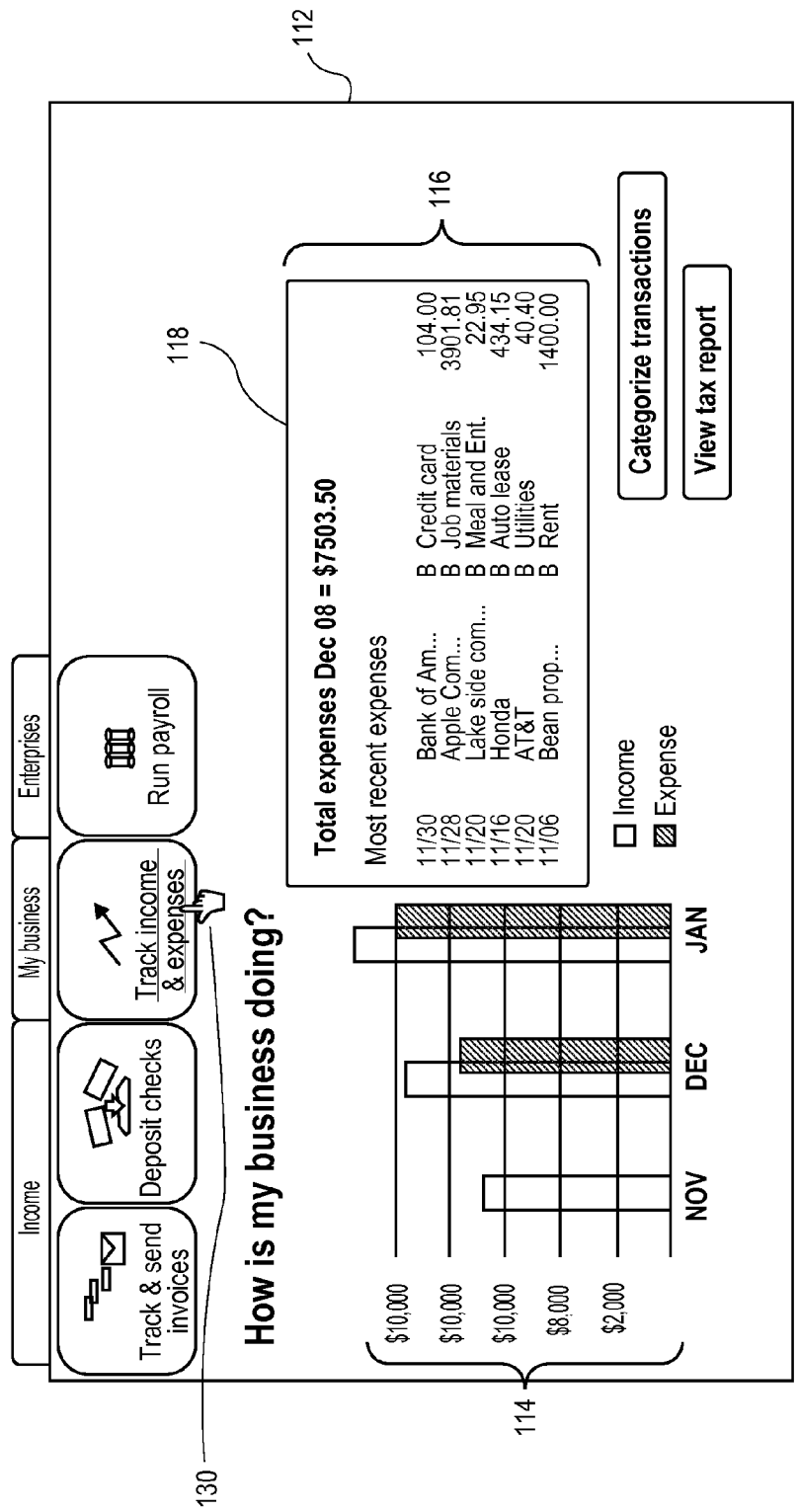
FIG. 5B illustrates one embodiment of a user interface embodiment wherein an operator is presented with a unified view of income/expense-related information.
Figure 5C:
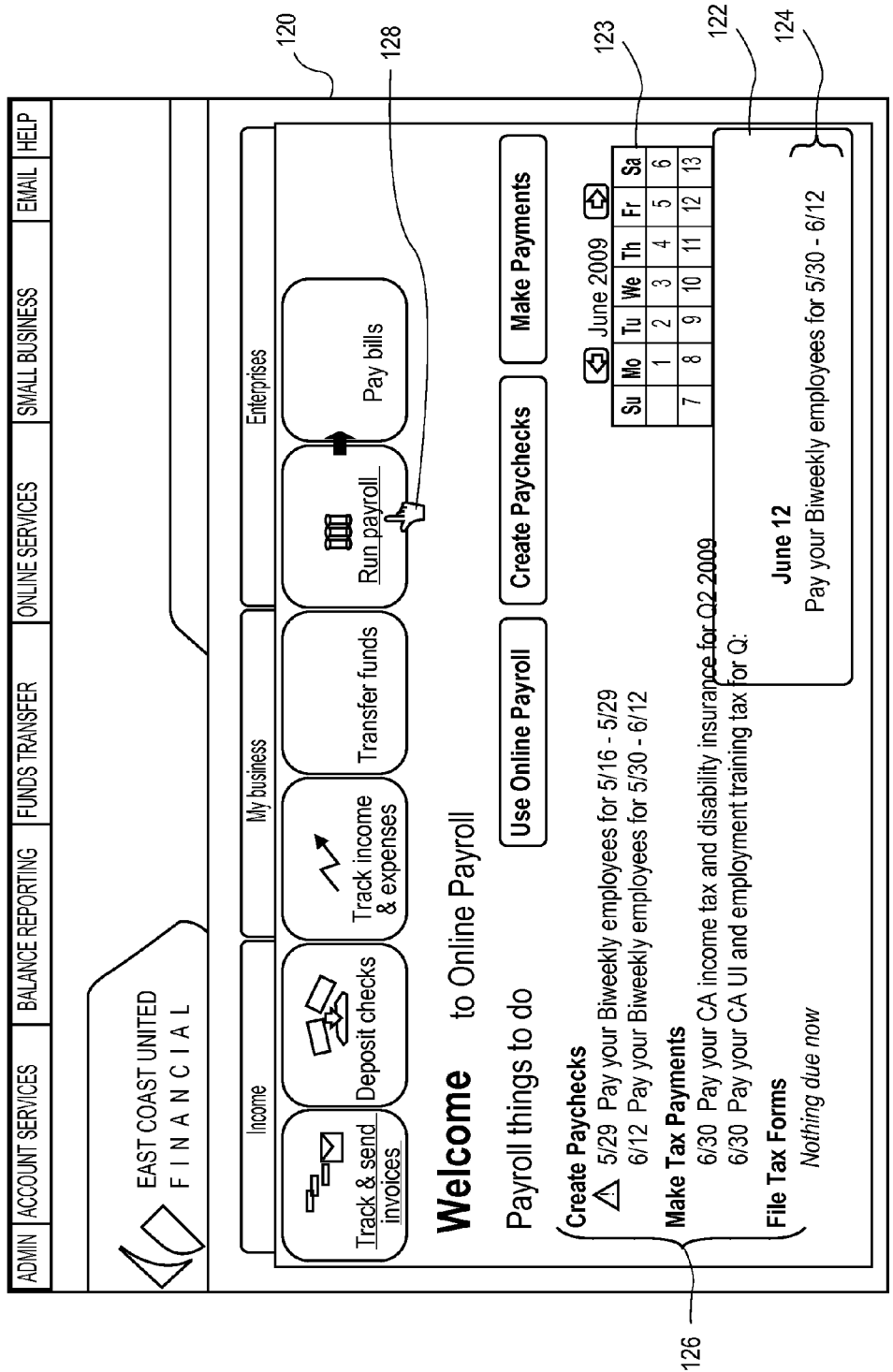
FIG. 5C illustrates one embodiment of a user interface embodiment wherein an operator is presented with a unified view of payroll-related information.

Referring to FIG. 5A, in implementation, the aggregated or unified updated data may be displayed for an operator through a local user interface (106) residing upon an operator computing platform or remote computing platform. The user interface (106) preferably is configured to present such data in a list, table, chart, or calendar format (108) for simplified viewing, and various aspects of such display may be clicked upon to lead the operator to further details regarding the pertinent item. Various applications or features, such as invoice tracking and sending (110) may be accessed by simple mouse clicking using the user interface (106). Referring to FIG. 5B, an income and expense tracking application or feature (130) has been selected, and the user interface (112) of this embodiment shows both a graphical chart (114) featuring income and expense for each month, as well as bubble windows (118) configured to appear as an operator mouses over or selects a particular element in the chart (114); the bubble windows (118) preferably are configured to reveal further information (116) regarding the chart element, such as a listing of each of the items underlying such chart element with an ability to continue getting more detail by selecting certain elements of the bubble window (118) display. Referring to FIG. 5C, a payroll administration feature (128) has been selected, and the user interface (120) features a task list (126), an interactive calendar (123), and bubble windows (122) akin to those featured in the user interface of FIG. 5B, to provide the operator with additional information (124) regarding various elements of the display.

Figure 6A:
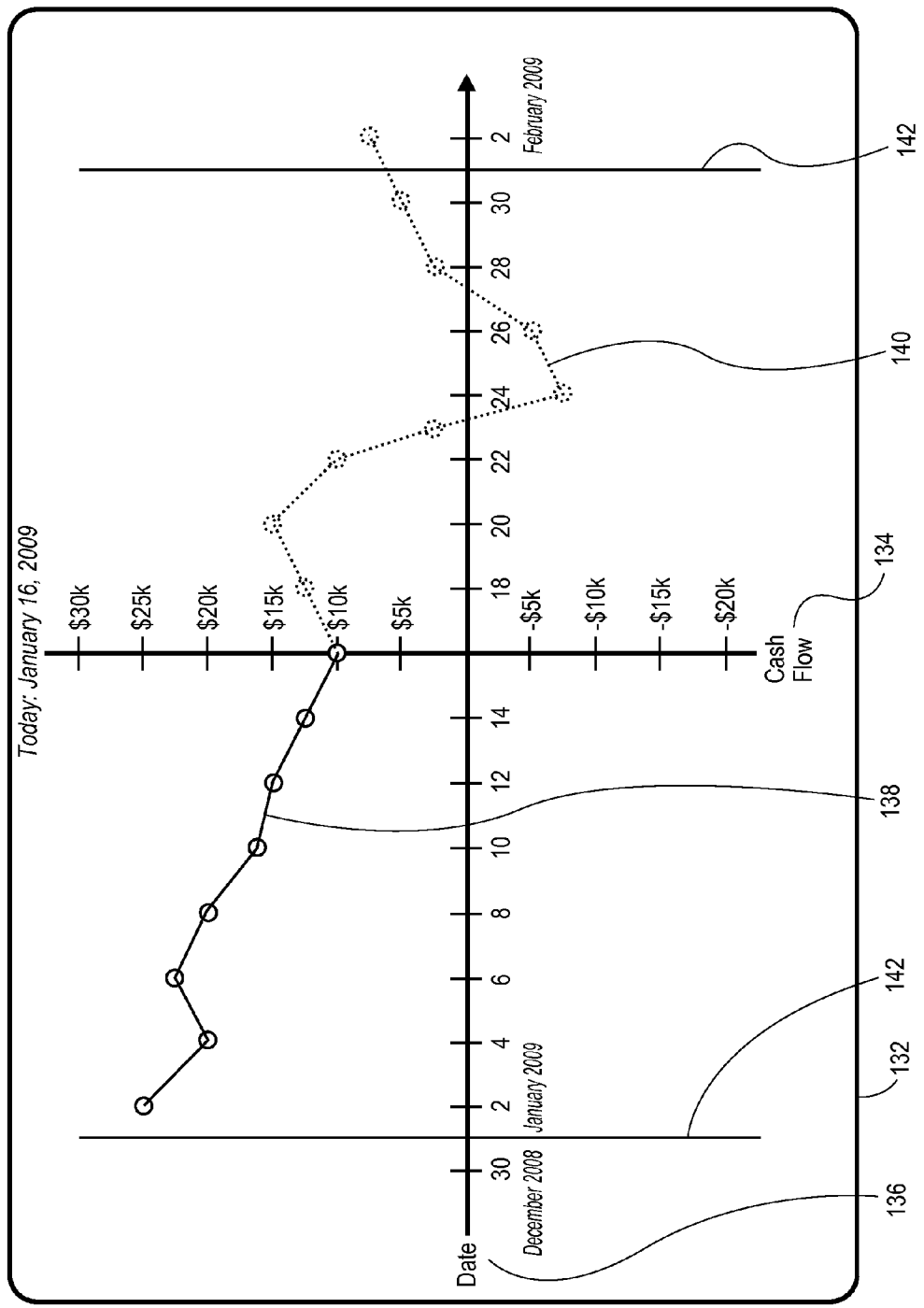
FIG. 6A illustrates one embodiment of a unified cash flow presentation interface wherein both retrospective and proform a data are depicted.

Referring to FIGS. 6A, 6B, 7, and 8A-8E, other embodiments are depicted wherein aspects of a user interface (132) may be utilized for retrospective and prospective cash flow analysis pertinent to an individual or enterprise. One embodiment of a cash flow analysis user interface is depicted in FIG. 6A, wherein a vertical cash flow axis (134) representing the current date is intersected with a horizontal time axis (136). Preferably a set of brackets (142) may be moved by the operator in the user interface, either by a textual entry or graphical control feature (such as dragging of one or both of the brackets with a mouse), to examine a different period of time; the depicted period of examination and display is January, 2009, and the date at which the application is being operated is Jan. 16, 2009. Thus dates ahead of Jan. 16, 2009 are in the future, and the remainder of January is in the past. The aforementioned system integration techniques and configurations may be utilized to provide a unified view of both retrospective, and also prospective (or "pro-form a") cash flow scenarios. As shown in the embodiment of FIG. 6A, the retrospective cash flow situation is charted with a solid line (138), while the pro-form a cash flow scenario, in view of future payments, receipts, transfers, and the like, as per the aggregated data from primary and secondary resources, is charted with a dashed line (140) in the user interface. The portion of such pro-form a cash flow chart that goes into the negative (i.e., below zero dollars on the cash flow axis—134) may be configured to also appear with a more bold or brightly-colored presentation, to notify the operator that she, or her enterprise, is about to run out of available cash according to the aggregated information. Alternatively, bubble windows or audible signals may be utilized to ensure that the operator receives such message. In one embodiment, resources may be automatically mustered, for example by financial institutions, to suggest and lead into processing of, through the user interface, loans, funds transfers, and the like. Referring to FIG. 6B, upon selecting a particular element of the retrospective or pro-form a cash flow presentation, the system may be configured to display a bubble window (144) containing further information (146) pertinent to such element, such as the daily entries underlying the cash flow accounting for the day, prospectively. Having such a system configuration facilitates a unified view of the cash flow scenario using information from disparate systems, and facilitates the operator's creation and execution of a plan to manage cash flow, such as pro-form a or future cash flow. In one embodiment, cash flow events may be altered through simple graphical user interface interaction between the operator and the interface, such as by dragging and dropping them with the mouse. For example, in one embodiment, after an operator sees that a particular cash flow event, such as the "rent payment" event featured in the bubble window (144) of FIG. 6B, should be moved, the operator may drag that event to a different date and let go with the mouse, causing that event to move to the pertinent mouse drop destination date; alternatively right clicking to a small dialogue box, bubble window, or the like with a text box or interactive calendar to allow for a destination selection may be utilized.

Figure 7:
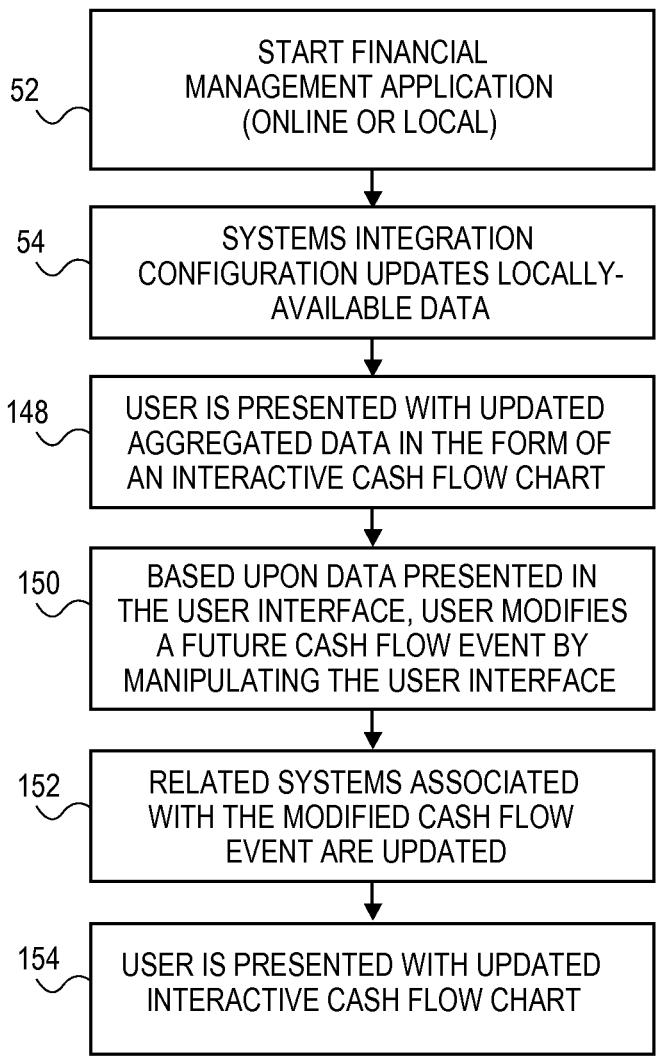
FIG. 7 illustrates a diagrammatic view of one embodiment of an integrated cash flow management configuration wherein a user or operator is presented with a unified, or aggregated, view of cash flow related information.

Referring to FIG. 7, for example, an embodiment is depicted wherein a financial management application is started (52) and a systems integration configuration updates locally available data assets (54) to form the basis for an aggregated data, or unified data, cash flow analysis. An operator or user is then presented with an updated interface (148) using the aggregated data in the form of an interactive cash flow chart such as that depicted in FIGS. 6A and 6B. Based upon the information presented in the user interface, the user may operate aspects of the user interface to modify a future cash flow event. For example, the user may decide to put off a bonus payout until later, and execute such command using the user interface (for example, by dragging and dropping with a mouse, changing a textual element, etc.), after which related systems associated with the modified cash flow event are updated (152) and the user is presented with an updated interactive cash flow interface taking account for the recent change (154).

Figure 8A:
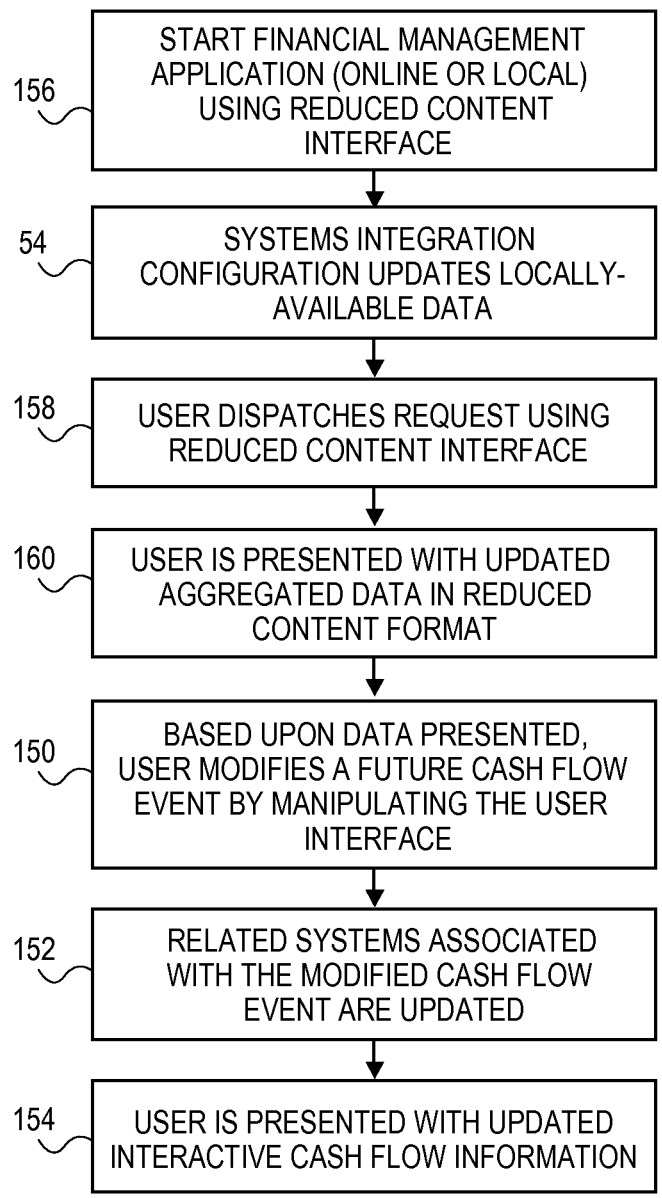
FIGS. 8A-8E illustrate diagrammatic views of various embodiments of an integrated cash flow management configuration wherein a user or operator is presented with a unified, or aggregated, view of cash flow related information in a reduced content format.

Referring to FIGS. 8A-8E, another embodiment is depicted, wherein variations of a reduced content interface may be utilized to manage prospective, or pro-forma, cash flow through a user interface. Referring to FIG. 8a, a financial management application is started and operated using a reduced content user interface (156), such as a relatively small cellphone user interface, which is operated more optimally using less content than would be typically presented using, for example, a full sized desktop computer with a conventionally-sized high resolution monitor. A systems integration configuration updates the locally available data (54), and a user is able to use the reduced content interface to dispatch a request, such as a request to view pro-form a cash flow (158), as described in further detail below in reference to FIG. 8B. The user is then presented with a user interface featuring data from an underlying aggregation in reduced content format (160), as described in further detail below in reference to FIG. 8C, and based upon such presentation, may modify a future cash flow event through the user interface (150), as described in further detail below in reference to FIG. 8D. Subsequently related systems may be updated (152) and the user presented witn an updated pro-form a cash flow presentation (154), as described in further detail below in reference to FIG. 8E.

Figure 8B:
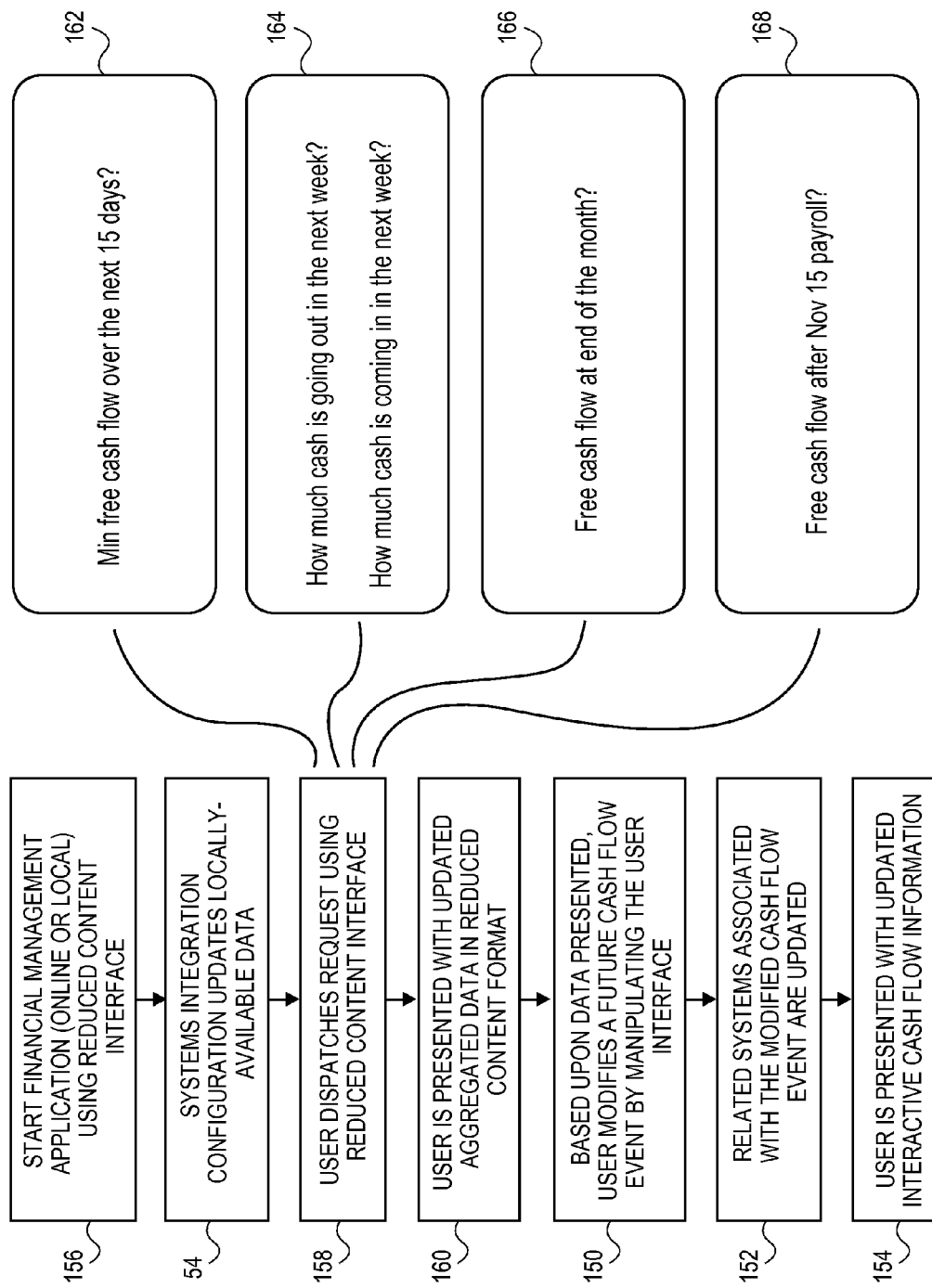

Referring to FIG. 8B, several illustrative variations are depicted for reduced content user request dispatches. In one variation (162), the operator wants to know what is the minimum free cash flow over the next 15 days, and he communicates this in a reduced content form proscribed by the pertinent computing systems involved (i.e., certain commands, shortcuts, and reduced content uses of language preferably are standardized for such operation). In another variation, the operator wants to know how much cash is going out and coming in during the next week (164). In another variation, the operator wants to know what the free cash flow will be at the end of the month given the current information (166). In another variation, the operator wants to know what the free cash flow will be after the Nov. 15, 2009 payroll (168).

Figure 8C:
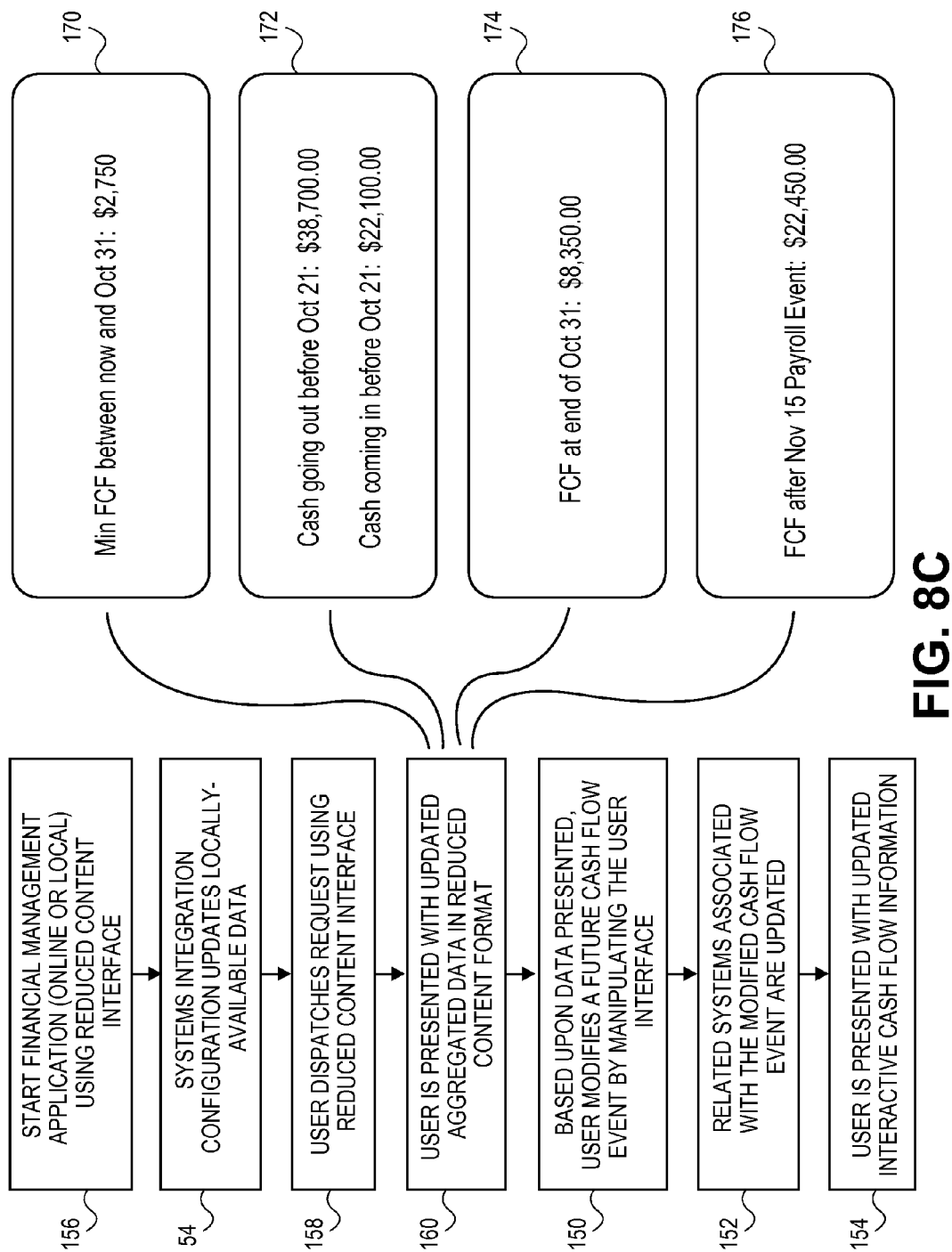

Referring to FIG. 8C, in response to the example requests illustrated with FIG. 8B, sample reduced content responses are depicted. The operator receives answers regarding minimum free cash flow (170), cash going out and coming in (172), cash flow at a particular time (174), and cash flow after a particular event (176).

Figure 8D:
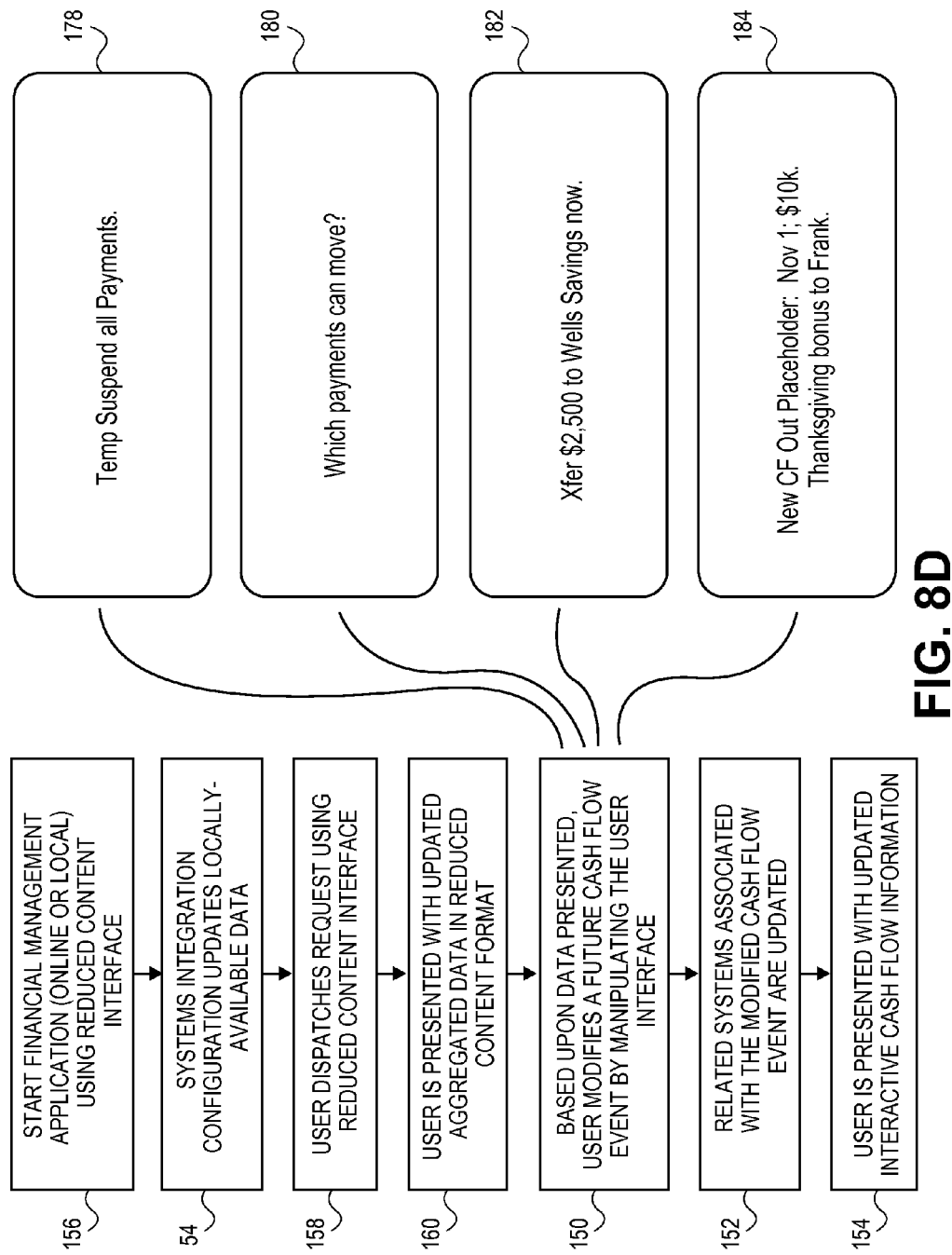
Figure 8E:
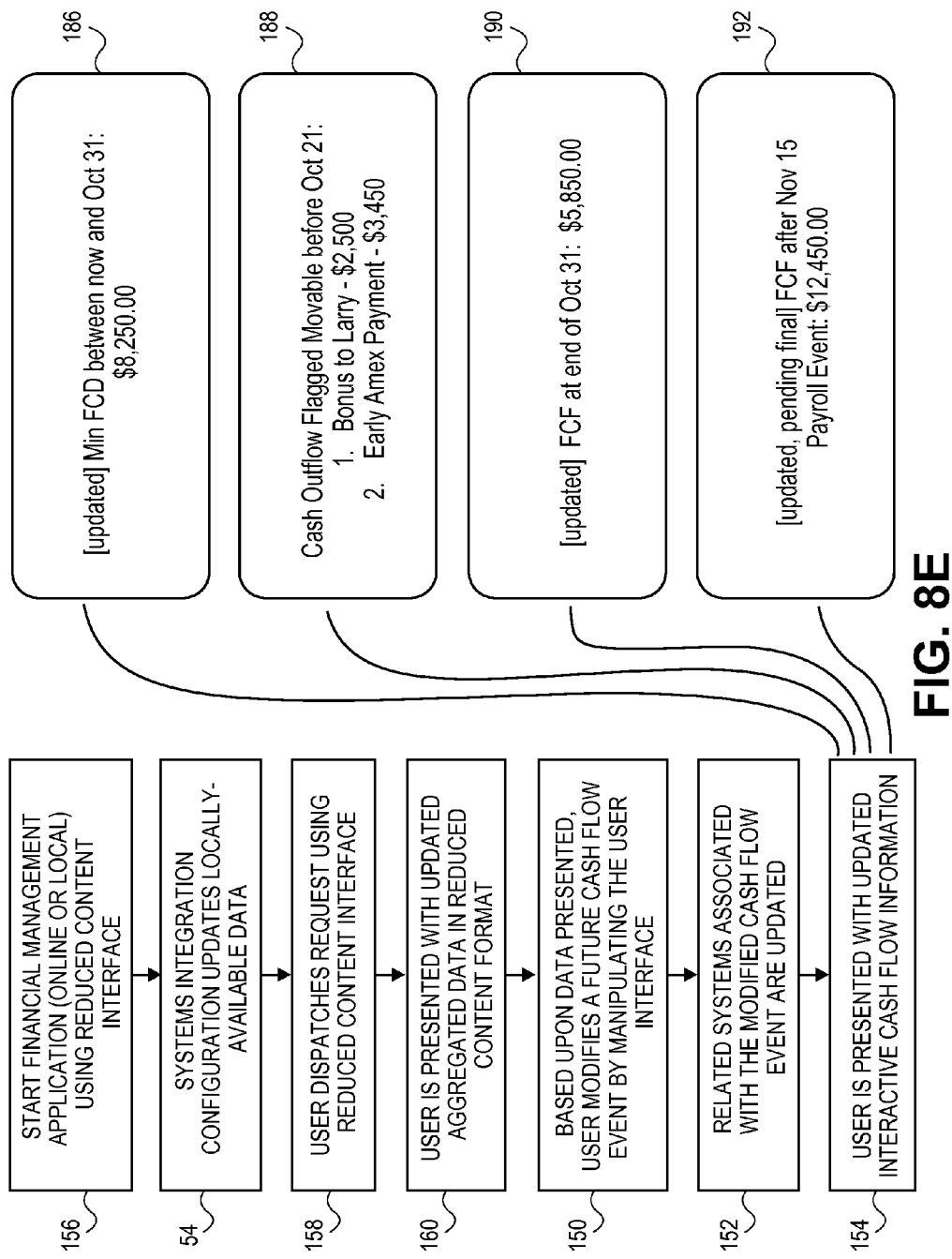

Referring to FIG. 8D, the operator may dispatch or issue additional commands or queries, such as a command to temporarily suspend all outgoing payments (178), a request to list any outgoing payments which have been previously labeled as movable in time (180), a command to transfer funds to a particular account at a particular time (182), and a request to add a new future cash flow element—a ten thousand dollar Thanksgiving bonus to Frank going out Nov. 1, 2009, temporarily marked "placeholder" until confirmed as a payable cash flow element later, perhaps using the same reduced content interface device, or perhaps using a different computing system. Preferably the system is configured to allow for both a reduced content exchange with a reduced content device, as well as a full content exchange with a conventional computing device. In other words, preferably if an operator uses her personal digital assistant to engage the system, reduced content exchange format may be selected manually or automatically, and when she subsequently engages the system with a laptop, a full content exchange format may be selected manually or automatically. Referring to FIG. 8E, the user is presented with updated interactive cash flow information pertinent to the previous round of interaction. In one variation, the updated minimum free cash flow for a particular period is presented (186). In another variation, cash flow events previously flagged to be movable are presented (188), to give the operator an understanding regarding options she has for managing cash flow. In another variation, an updated free cash flow amount is presented for a specific future date (190). In another variation, an updated free cash flow amount is presented in view of a now scheduled, but pending final approval, payroll event pertinent to the Thanksgiving bonus (192). In a further variation, the system may be configured to allow the operator to run test scenarios and examine pro-form a outcomes before actual execution of event changes; in other words, the operator may use the interface to change cash flow events around, examine the outcome using the interface, and decide to proceed with executing such changes, or cancel such changes and return to the status quo without any actually executed changes.

While multiple embodiments and variations of the many aspects of the invention have been disclosed and described herein, such disclosure is provided for purposes of illustration only. For example, wherein methods and steps described above indicate certain events occurring in certain order, those of ordinary skill in the art having the benefit of this disclosure would recognize that the ordering of certain steps may be modified and that such modifications are in accordance with the variations of this invention. Additionally, certain of the steps may be performed concurrently in a parallel process when possible, as well as performed sequentially. Accordingly, embodiments are intended to exemplify alternatives, modifications, and equivalents that may fall within the scope of the claims.

The invention claimed is:

1. A computerized financial management system for integrating disparate financial systems, comprising:
 a primary database comprising banking and transaction related information of a user of a financial management application, wherein the primary database contains a file of banking and transaction related information in either OFX or QFX format;
 a computing platform comprising or accessing the financial management application and being natively coupled to the primary database, the financial management application being configured to display a user interface including information from the primary database and to process user instructions regarding the processing of such information, wherein the primary database is automatically updated with additional banking and transaction related information of the user acquired from one or more secondary databases associated with an online banking interface such that the primary database is synchronized with the one or more secondary databases in a one-way synchronization, wherein the primary database is configured to be operated by the computing platform, and the at least one secondary database is accessible to but not configured to be directly operated by the computing platform, and wherein the financial management application is further configured to present to the user one or more unified views of banking and transaction related information aggregated from the primary and secondary databases, the one or more unified views comprising banking and transaction related information comprising invoice data, check data, income and expense data, and payroll data and to allow the user to execute financial decision instructions on the computing platform based upon the one or more unified views using the user interface.

2. The system of claim 1, wherein the primary database is locally accessible to the computing platform.

3. The system of claim 1, wherein the primary database is remotely accessible to the computing platform.

4. The system of claim 2, wherein the primary database is co-located with the computing platform.

5. The system of claim 1, further comprising a central computing platform operatively coupled to the primary database and the computing platform, wherein the computing platform is locally available to the user and the central computing platform is remotely available to the user.

6. The system of claim 1, wherein the one or more secondary databases reside remotely from the primary database and the computing platform.

7. The system of claim 1, wherein the computing platform is a cellphone, a smartphone, a personal digital assistant, a netbook computer, a laptop computer, a desktop computer, or a computer terminal.

8. The system of claim 1, wherein the computing platform is configured to display a reduced content user interface, the reduced content user interface configured to display information and to process instructions regarding the processing of such displayed information from the user with a relatively small amount of graphical content.

9. The system of claim 1, wherein the computing platform, the primary database, and the at least one secondary database are operatively coupled utilizing a connection that is a wired local connection, a wireless local connection, a wired remote connection, or a wireless remote connection.

10. The system of claim 1, wherein the primary database is automatically updated and synchronized with the one or more secondary databases using a non-native coupling comprising either screen scraping or one-way application programming interface (API) integration.

11. The system of claim 10, wherein the non-native coupling comprises an API-integration configured to dispatch extensible markup language (XML) packets.

12. The system of claim 1, wherein the computing platform is configured to present the user with a unified view of billing data, on-line banking data and payroll data.

13. The system of claim 12, wherein the computing platform is further configured to allow the user to execute financial decision instructions based upon any one of the billing data, on-line banking data and payroll data presented in the unified view.

14. The system of claim 12, wherein the computing platform is further configured to present the user with options to view fund transfer data and bill pay data, and to allow the user to execute financial decision instructions based upon any one of the presented invoice data, check data, income and expense data, payroll data, fund transfer data and bill pay data.

15. The system of claim 1, the unified view comprising data of at least one of unpaid invoices payable to the user, user expenses, and user payroll.

16. The system of claim 1, the user computing platform being configured to allow the user to send or track an invoice.

17. The system of claim 1, the computing platform being configured to categorize user income and expense data and to display categorized income and expense data.

18. The system of claim 1, the computing platform being configured to allow the user to pay taxes.

19. The system of claim 1, the computing platform being configured to display the user interface to the user during an online banking session conducted through an online banking interface.

20. The system of claim 19, wherein a financial management application executing on the computing platform is accessible by the user through the online banking session user interface.

21. The system of claim 1, wherein the transaction data is data of completed transactions within an on-line bank account of the user.

22. The system of claim 1, wherein the financial management application and the online banking system are independently accessible by the user through respective different user interfaces.

23. A computer-implemented method for integrating disparate financial systems, the method being performed by a computing platform comprising or accessing a financial management system operable by a user, the method comprising:
the computing platform executing the financial management system, providing the user with access to one or more unified views of banking and transaction related information aggregated from a natively coupled primary database containing a file of banking and transaction related information in either OFX or QFX format and at least one secondary database associated with an online banking interface, the computing platform synchronizing the at least one secondary database with the primary database in a one-way synchronization, wherein the primary database is configured to be operated by the computing platform, and wherein the secondary database is accessible to but not configured to be directly operated by the computing platform;
the computing platform, through the financial management system, allowing the user to execute financial decision instructions based upon the one or more unified views using the user interface, the one or more unified views comprising banking and transaction related information comprising invoice data, check data, income and expense data, and payroll data; and
the computing platform, through the financial management system, automatically updating and synchronizing the primary database with additional banking and transaction related information from the one or more secondary databases.

24. The method of claim 23, wherein automatically updating and synchronizing comprises exchanging the additional banking and transaction related information between the primary database and at least one secondary database utilizing a wired local connection, a wireless local connection, a wired remote connection, or a wireless remote connection.

25. The method of claim 23, wherein the primary database is automatically updated and synchronized by exchanging the additional banking and transaction related information between the primary database and at least one secondary database utilizing an integration modality of screen scraping or one-way application programming interface (API) integration, or two way API integration.

26. The method of claim 23, wherein automatically updating and synchronizing are performed at a predetermined frequency, in real-time, or in near-real-time.

27. The method of claim 23, further comprising updating the primary database based upon financial decision instructions executed by the user.

28. The method of claim 23, further comprising presenting the user with an updated unified view of the banking and transaction related information using the user interface subsequent to allowing the user to execute financial decision instructions.

29. The method of claim 23, wherein providing the user with access to one or more unified views comprises creating a reduced content view configured to be optimized for a reduced content display.

30. The method of claim 23, wherein the one or more unified views are presented graphically in the user interface in an interactive manner such that the user is able to graphically select certain aspects of a report accessible through the user interface to have further underlying details presented.

31. The method of claim 23, wherein the transaction data is data of completed transactions.

32. The method of claim 23, wherein the financial management application and the online banking system are independently accessible by the user through respective different user interfaces.

* * * * *